United States Patent
Kollig et al.

(10) Patent No.: US 11,983,587 B2
(45) Date of Patent: May 14, 2024

(54) BIOMETRIC INTERFACE

(71) Applicant: IDEX BIOMETRICS ASA, Oslo (NO)

(72) Inventors: Peter Eckehard Kollig, Hampshire (GB); Adrian Wise, Bracknell (GB)

(73) Assignee: IDEX Biometrics ASA, Oslo (NO)

( * ) Notice: Subject to any disclaimer, the term of this patent is extended or adjusted under 35 U.S.C. 154(b) by 431 days.

(21) Appl. No.: 17/272,131

(22) PCT Filed: Aug. 27, 2019

(86) PCT No.: PCT/EP2019/072780
§ 371 (c)(1),
(2) Date: Feb. 26, 2021

(87) PCT Pub. No.: WO2020/043695
PCT Pub. Date: Mar. 5, 2020

(65) Prior Publication Data
US 2021/0256338 A1    Aug. 19, 2021

(30) Foreign Application Priority Data
Aug. 31, 2018 (GB) ..................... 1814210

(51) Int. Cl.
*G06K 19/07* (2006.01)
*G06K 19/077* (2006.01)

(52) U.S. Cl.
CPC ... *G06K 19/0718* (2013.01); *G06K 19/07769* (2013.01)

(58) Field of Classification Search
CPC ......... G06K 19/0718; G06K 19/07769; G06K 19/072; G06K 19/0772; G06K 7/1404;
(Continued)

(56) References Cited

U.S. PATENT DOCUMENTS

2005/0178827 A1* 8/2005 Shatford .............. G06K 19/077
235/380
2005/0240778 A1* 10/2005 Saito ................... H04W 12/068
713/186
(Continued)

FOREIGN PATENT DOCUMENTS

EP    3159832    4/2017
EP    3493118    6/2019
(Continued)

OTHER PUBLICATIONS

GB Application No. GB1814210.9, Search Report under Section 17(5), dated Jan. 23, 2020, 3 pages.
(Continued)

*Primary Examiner* — Daniel I Walsh
(74) *Attorney, Agent, or Firm* — Smith Tempel Blaha LLC; Michael J. Tempel

(57) ABSTRACT

A device for communication with a terminal. The device comprises: a communication unit for communicating with the terminal; a biometric unit comprising a biometric sensor for sensing biometric data; contacts for connecting the device to the terminal; a first physical interface between the biometric unit and the contacts configured to enable contact communication between the biometric unit and the terminal; and a second physical interface between the communication unit and the biometric unit configured to enable contact communication between the communication unit and the biometric unit. The device is configured such that all contact communications between the terminal and the communication unit are routed through the biometric unit via the first and second physical interfaces.

19 Claims, 8 Drawing Sheets

(58) Field of Classification Search
CPC . G06T 7/70; G06T 2207/10016; G06V 40/18; G02B 2027/0138; G02B 2027/014; G02B 27/0179; G02B 27/0101; G07C 9/29
See application file for complete search history.

(56) References Cited

U.S. PATENT DOCUMENTS

| | | | | |
|---|---|---|---|---|
| 2006/0113381 | A1* | 6/2006 | Hochstein | G06K 19/07345 235/382 |
| 2007/0228154 | A1* | 10/2007 | Tran | G06K 7/10297 235/492 |
| 2008/0040615 | A1* | 2/2008 | Carper | G06F 21/32 713/186 |
| 2008/0223925 | A1* | 9/2008 | Saito | G06Q 20/341 235/380 |
| 2013/0207786 | A1* | 8/2013 | Hutzler | G06V 40/70 235/492 |
| 2014/0210589 | A1* | 7/2014 | Grace | G06F 21/34 340/5.51 |
| 2016/0071001 | A1* | 3/2016 | Tsuboi | G06K 19/0775 235/440 |
| 2017/0293342 | A1* | 10/2017 | Field | G06F 1/26 |
| 2018/0082165 | A1* | 3/2018 | Mosteller | H01L 25/0655 |
| 2018/0129831 | A1* | 5/2018 | Yokoi | G06K 19/0701 |
| 2018/0197056 | A1 | 7/2018 | Bousquet et al. | |
| 2019/0065919 | A1* | 2/2019 | Maheshwari | G06K 19/0718 |
| 2019/0236320 | A1* | 8/2019 | Ahluwalia | G06K 19/0718 |
| 2019/0236321 | A1* | 8/2019 | Poon | G06K 19/0709 |
| 2019/0272363 | A1* | 9/2019 | Suwald | G07F 7/0813 |
| 2019/0318340 | A1* | 10/2019 | Chen | G06Q 20/3278 |
| 2019/0340398 | A1* | 11/2019 | Mosteller | G06K 7/10366 |
| 2020/0089271 | A1* | 3/2020 | Shiga | G06F 1/08 |
| 2020/0285929 | A1* | 9/2020 | Rahman | G06K 19/0718 |
| 2021/0034726 | A1* | 2/2021 | Knausz | G06Q 20/341 |
| 2021/0034834 | A1* | 2/2021 | Mackin | G06F 21/84 |
| 2021/0103788 | A1* | 4/2021 | Mercier | G06K 19/0709 |
| 2021/0124815 | A1* | 4/2021 | Rindal | H04L 9/008 |
| 2021/0133529 | A1* | 5/2021 | Yeap | G06K 19/0772 |
| 2021/0192304 | A1* | 6/2021 | Mercier | G06K 19/0712 |
| 2021/0192529 | A1* | 6/2021 | Souchon | G06F 21/32 |
| 2021/0218725 | A1* | 7/2021 | Fang | H04L 63/083 |
| 2021/0256338 | A1* | 8/2021 | Kollig | G06K 19/07769 |
| 2021/0334615 | A1* | 10/2021 | Kargl | G06K 19/07794 |
| 2021/0344783 | A1* | 11/2021 | Jeong | H04M 1/026 |
| 2021/0357716 | A1* | 11/2021 | Eaton | G06K 19/0712 |
| 2022/0215220 | A1* | 7/2022 | Mathieu | G06K 19/0718 |
| 2022/0366204 | A1* | 11/2022 | Pueschner | G06K 19/0718 |
| 2023/0098452 | A1* | 3/2023 | Park | G06F 21/32 713/186 |
| 2023/0259734 | A1* | 8/2023 | Katano | B42D 25/46 235/492 |
| 2023/0306214 | A1* | 9/2023 | Katano | G06K 7/10366 235/451 |

FOREIGN PATENT DOCUMENTS

| | | |
|---|---|---|
| GB | 2548638 | 9/2017 |
| GB | 2573497 | 11/2019 |
| WO | 2004025545 | 3/2004 |
| WO | 2014171989 | 10/2014 |

OTHER PUBLICATIONS

PCT Application No. PCT/EP2019/072780, International Search Report and Written Opinion, dated Oct. 29, 2019, 13 pages.
CN Application No. 201980056674.4—CN First Office Action, dated Aug. 28, 2023, 17 pages.

* cited by examiner

BIOMETRIC INTERFACE

BACKGROUND

This disclosure relates to interfacing communications between modules of a multifunction device. One example of such a device is a smart card with biometric functionality.

A smart card may refer to a device that includes an embedded integrated circuit chip and internal memory. The internal memory may be located on the integrated circuit chip, or be a separate chip embedded within the card. A smart card may be a contact card, a contactless card, or may be capable of operating as a contact and a contactless card. Smart cards exist in a wide variety of form factors, including plastic cards, key fobs, watches, wearables, electronic passports and USB-based tokens and subscriber identification modules (SIMs) used in mobile phones.

A contact card communicates with a terminal (e.g. a card reader) by physically connecting to the terminal. For example, a contact card may comprise one or more contacts that provide electrical connectivity to a terminal when the card and terminal are brought into suitable physical contact (e.g. by inserting the card into a slot within the terminal). The contact card is powered by the terminal when it is physically connected to the terminal.

A contactless card communicates with a terminal without direct physical contact. Typically, a contactless card communicates with a terminal via radio waves. The contactless card may include an antenna to receive an electromagnetic signal, such as an RF signal, emitted from a terminal. Likewise, data from the card can be communicated back to the terminal by means of the card's antenna. The contactless card is powered by harvesting power from the RF signal.

Smart card technology is being implemented within a variety of devices used to perform increasingly varied functions, for example to perform payments, grant a user physical access to a region of an environment, to store personal identification information of the user; identify or authenticate a user etc.

A device may be capable of performing multiple different functions, and for those different functions to be coupled. For example, it is known to incorporate a biometric sensor in a smart card for the purpose of identifying a user of the smart card, and for another action such as a payment to be authorised on the basis of that identification. In such a case, the primary function of the card is to perform payments. An embedded chip performs the payment functions of the card. Often known as a Secure Element, the chip provides a secure, encrypted data path for communications and user authentication between the smart card and terminal. Authentication of the user via sensed biometric information is a supplemental function of the card. A biometric unit incorporating a biometric sensor senses the biometric information of a user. A dedicated physical interface between the chip and biometric unit enables biometric communications between the two. Thus, in order for a payment card to be adapted to enable biometric verification of a user, as well as incorporating a biometric unit into the card, the embedded chip in the card needs to be modified to interface to the biometric unit.

It would be desirable for a device to be able to incorporate biometric functionality in addition to its primary function without having to modify the physical characteristics of the embedded chip which performs the primary function.

SUMMARY OF THE INVENTION

According to a first aspect, there is provided a device for communication with a terminal, the device comprising: a communication unit for communicating with the terminal; a biometric unit comprising a biometric sensor for sensing biometric data; contacts for connecting the device to the terminal; a first physical interface between the biometric unit and the contacts configured to enable contact communication between the biometric unit and the terminal; and a second physical interface between the communication unit and the biometric unit configured to enable contact communication between the communication unit and the biometric unit; the device being configured such that all contact communications between the terminal and the communication unit are routed through the biometric unit via the first and second physical interfaces.

The second physical interface may carry both biometric communications and primary communications, the biometric communications originating from the biometric unit or communication unit and being destined for the communication unit or biometric unit, the primary communications originating from the terminal or communication unit and being destined for the communication unit or terminal.

The biometric unit may comprise a biometric controller for controlling operation of the biometric unit.

The biometric unit may comprise a multiplexer configured to: receive inputs from the contacts and from the biometric controller, and multiplex those received inputs onto the second physical interface; and receive inputs from the communication unit on the second physical interface, and direct those received inputs to the contacts or biometric controller. The biometric controller may comprise the multiplexer.

The biometric controller may be configured to: monitor primary communications between the terminal and the communication unit for a marker; and on identifying the marker, controlling the multiplexer to switch from routing primary communications between the contacts and the communication unit to routing biometric communications between the biometric controller and the communication unit.

The device may be configured to electrically isolate the contacts from biometric communications between the biometric unit and the communication unit.

The first physical interface may comprise an I/O signal line comprising a isolator for isolating the contacts from the biometric communications on the second physical interface. The isolator may be a pass transistor, the gate of the pass transistor being connected to the supply voltage of the biometric controller. The isolator may be a one-way isolator.

The I/O signal line may further comprise a resistive pull-up on the biometric controller side of the isolator.

The first physical interface may comprise a reset signal line comprising a one-way isolator for isolating the contacts from the biometric communications on the second physical interface.

The one-way isolator may be a pass transistor, the gate of the pass transistor being connected to the supply voltage of the biometric controller. The one-way isolator may be a diode. The reset signal line may further comprise a resistive pull-up on the biometric controller side of the one-way isolator.

The device may output a clock signal from the biometric controller onto a clock signal line on the second physical interface to isolate the contacts from the biometric communications on the second physical interface.

The biometric controller may output one of the following as a clock interface signal: (i) a voltage calibrated version of a terminal clock signal from the terminal; and (ii) an internally generated clock signal from the biometric controller.

The biometric controller may select the baud rate of biometric communications with the communication unit to be proportional to the frequency of the clock interface signal.

The device may enable contact communication between the communication unit and biometric unit according to a first communications protocol, and contact communication between biometric unit and the terminal according to a second communications protocol. The first communications protocol may be the same as the second communications protocol.

The biometric unit and communication unit may be configured to embed biometric communications within messages of the first communications protocol.

The biometric unit and communication unit may be configured to utilise at least one different communication parameter for biometric communications and primary communications.

The biometric unit and communication unit may be configured to use a higher baud rate for biometric communications than primary communications.

The first communications protocol may be ISO 7816.

The biometric unit and communication unit may be configured to set the most significant nibble of the class CLA field of the header of each Application Protocol Data Unit (APDU) of ISO 7816 to a predetermined value to identify the APDU as carrying a biometric communication.

When the device is in contact with the terminal, power may be received through the contacts and routed to the communication unit via the biometric unit.

The device may further comprise: an antenna; and a third physical interface between the antenna and the communication unit configured to enable contactless communication between the terminal and the communication unit according to a third communications protocol; the device being configured to harvest power from a radio frequency field received at the antenna when the antenna is receiving communications from the terminal, and route power from the antenna to the communication unit via the biometric unit.

The third communications protocol may be ISO 14443.

The biometric controller may, whilst the communication unit is performing contactless communications with the terminal, control the communication unit to perform biometric communications with the biometric controller over the second physical interface according to the second communications protocol.

The communication unit may detect: (i) that it is in a contact mode of operation if the communications on the second physical interface it receives originate from the contacts, and (ii) that it is in a contactless mode of operation if the communications on the second physical interface it receives originate from the biometric unit. The communication unit may be configured to detect that it is in a contactless mode of operation if it senses traffic on the third physical interface. The biometric unit may be configured to detect that it is in a contact mode of operation if it senses power on the first physical interface. The biometric unit may be configured to detect that it is in a contact mode of operation if it senses a clock signal on the first physical interface. The biometric unit may be configured to detect that it is in a contactless mode of operation if it senses power on a fourth physical interface between the antenna and the biometric unit.

BRIEF DESCRIPTION OF THE DRAWINGS

The present disclosure will now be described by way of example with reference to the accompanying drawings. In the drawings:

FIG. 4a illustrates exemplary structure of the level shifter and multiplexer of FIG. 3a;

DETAILED DESCRIPTION

Figure 1:
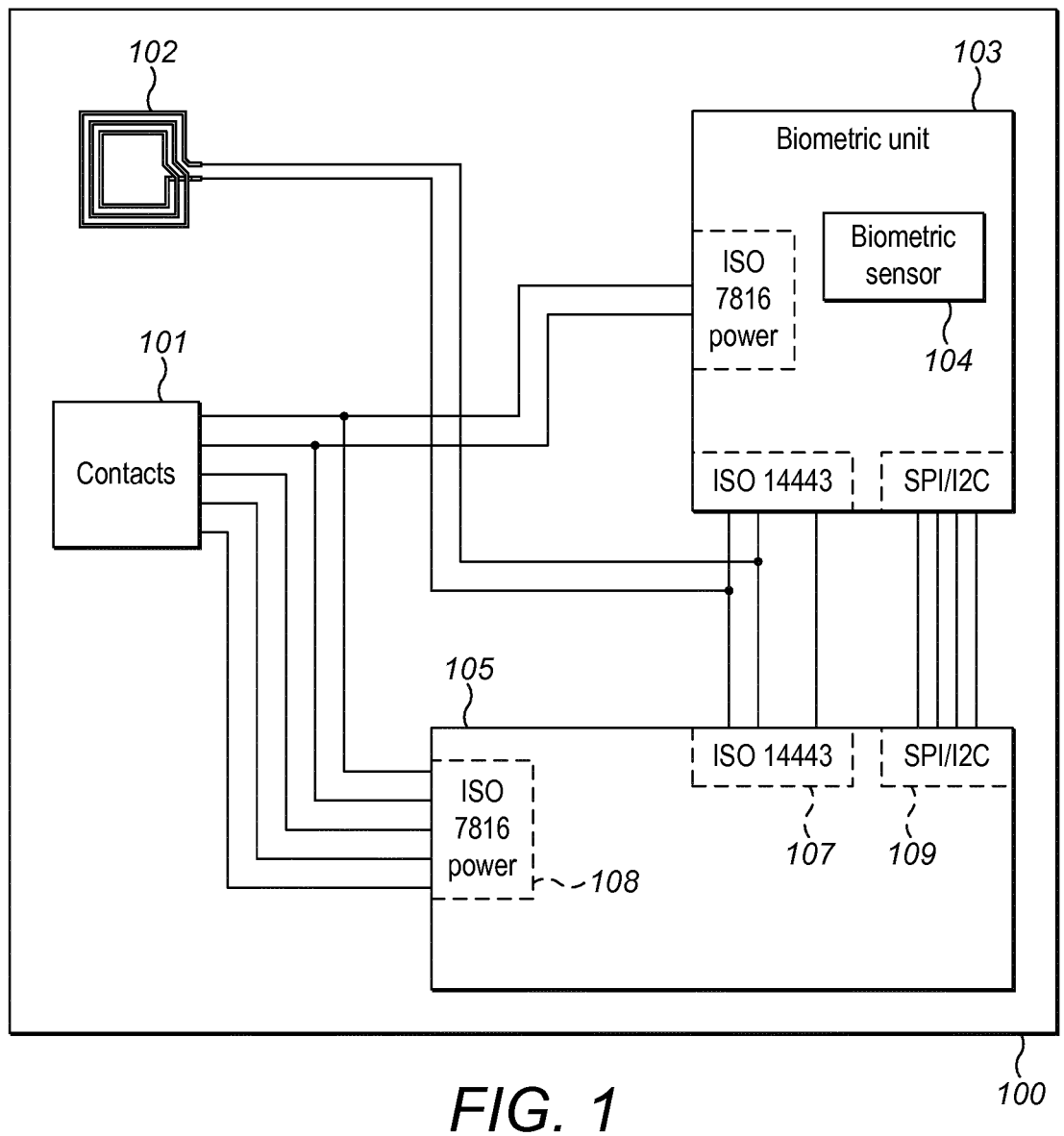
FIG. 1 illustrates an architecture of a smart card.

FIG. 1 illustrates a schematic diagram of a smart card which is capable of contact and contactless communications. The smart card 100 comprises contacts 101, antenna 102, biometric unit 103 incorporating a biometric sensor 104, and a chip 105 for performing the primary function of the card. The chip 105 comprises an ISO 14443 interface 107 for contactless communications via the antenna 102, an ISO 7816 interface 108 for contact communications via the contacts 101, and a dedicated interface 109 for communicating with the biometric unit 103. The dedicated interface 109 may be an SPI bus, I2C bus or other mechanism.

The following description relates to a device, such as a smart card, in which the chip for performing the primary function of the device utilises the same physical interface for contact communications with the terminal as for biometric communications with the biometric unit. Thus, no dedicated physical interface solely for biometric communications between the chip and the biometric unit is required. In the case of smart cards, this enables card integrators to use a wider range of Secure Elements when assembling smart cards with biometric functionality. Since the Secure Element used is not modified, no additional industry certification of the Secure Element is required, which reduces the time taken to bring the biometric capable smart cards to market.

The following figures illustrate exemplary architectures of multi-function devices. In each of these examples, the device is in the form of a smart card, and the terminal with which it communicates is in the form of a card reader. This is for the purpose of illustration only, and it will be understood that each of the following examples could be implemented in any suitable device capable of performing contact and/or contactless communication with a terminal. The following examples could for example be implemented within a device adopting a form factor that is not a card, for example a fob, a dongle, security token (e.g. a USB token) or subscriber identification module (SIM). Alternatively, the following examples could be implemented within devices integrated into a communication device such as a mobile phone or smartphone; a wearable device, such as a bracelet, watch, a glove/pair of gloves, a pin (e.g. a brooch), a badge or some other contactless wearable device.

Figure 2:
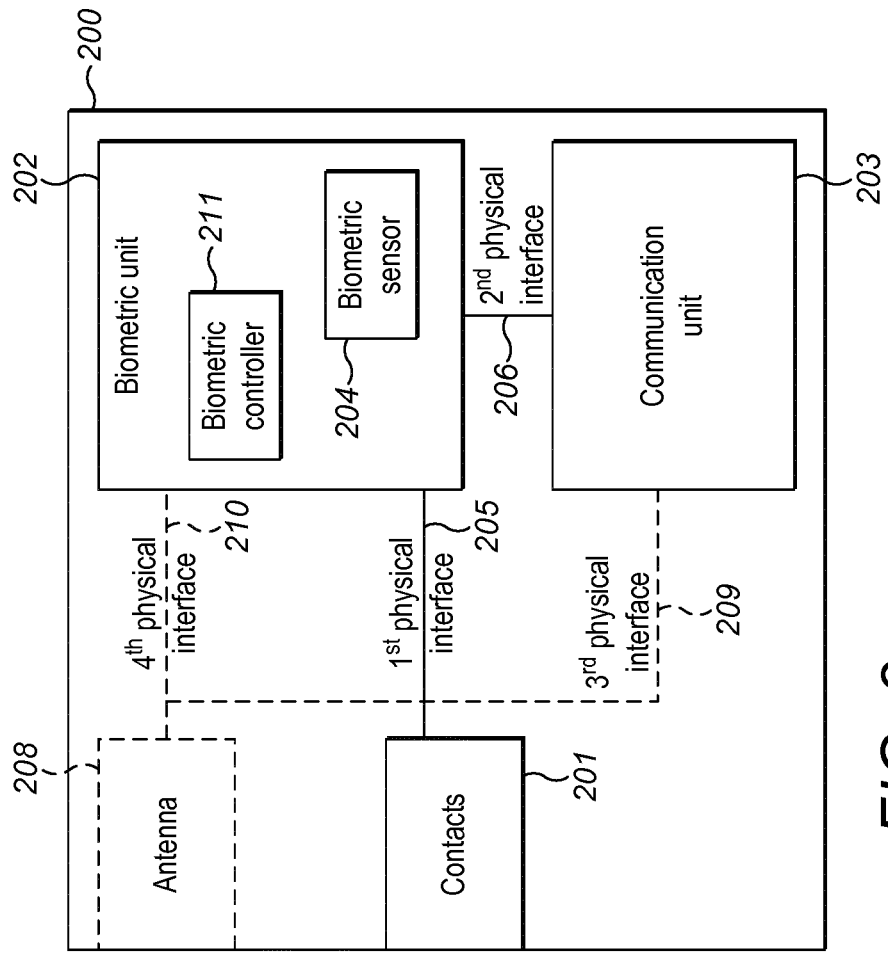
FIG. 2 illustrates an example architecture of a smart card according to an embodiment of the invention.
Figure 2:

FIG. 2 illustrates a card 200 comprising contacts 201, a biometric unit 202 and a communication unit 203. A first physical interface 205 connects the contacts 201 to the biometric unit 202. A second physical interface 206 connects the biometric unit 202 to the communication unit 203. There is no physical interface directly connecting the contacts 201 to the communication unit 203.

The card may have a card body which is the same size and shape as a conventional smart card. Alternatively, the card body may have a different size and/or shape as a conventional smart card. The card may be cuboid in shape, with one dimension substantially less than both the others, for example less than 10% of either of the other dimensions. The thickness of the card may be between 0.5 mm and 2.0 mm. The card may satisfy the physical dimensions set out in ISO 7810 as at 30 Aug. 2018 for an ID-1 card.

The communication unit 203 performs the primary function of the card. This may be, for example, generating data to communicate with a terminal regarding financial transactions. Alternatively, the communication unit may operate to provide some other function associated with the card requiring communication with a terminal, for example: providing physical access of the card user to a region of an environment (e.g. building access); identifying or authenticating a user; retrieval of personal user information (e.g. medical information and records) etc. The communication unit may be an embedded chip, for example an IC chip. The communication unit may conveniently be implemented as a single integrated circuit. The communication unit may be a Secure Element. The communication unit comprises a processor and a memory. The memory stores in a non-transitory manner code that is executable by the processor to perform the logic functions described herein of the communication unit. The communication unit may additionally include a transitory memory for short-term storage of data. For example, short-term storage of data gathered by the biometric sensor after initial processing by the biometric controller.

The biometric unit may conveniently be implemented as a single integrated circuit. Suitably, the biometric unit 202 comprises a biometric controller 211 for controlling operation of the biometric unit. The biometric controller 211 comprises a processor and a memory. The memory has a region which stores in a non-transitory manner code that is executable by the processor to perform the logic functions described herein of the biometric unit. The memory may also have a region which stores biometric validation data.

The biometric unit 202 comprises a biometric sensor 204. The biometric sensor 204 senses biometric data of a user. The nature of the biometric sensor 204 will depend on the type of biometric data that is to be used. Some examples are: a fingerprint sensor for capturing fingerprints; a camera for capturing facial images, retina images or iris images; a vein pattern sensor for capturing vein patterns; a microphone for capturing voice patterns; or an accelerometer for capturing movement data. The biometric unit may include multiple sensors for capturing multiple types of biometric data, or for capturing multiple instances of biometric data of the same type: for example for capturing fingerprints on both sides of the card simultaneously.

The biometric validation data represents reference biometric data for an authorised user of the card. Alternatively, such biometric validation data may be stored in the communication unit. Biometric data captured by the biometric sensor can be used in a biometric recognition or authentication process. In such a process, the biometric data is compared with the validation data to assess whether it is representative of the authorised user, for example by one of the following processes: fingerprint recognition; iris recognition; vein recognition; retina recognition; voice recognition; behavioural recognition; facial recognition, etc. In one example, that comparison may be done in the biometric unit, e.g. by the processor. In another example, that comparison may be done by a processor in the communication unit.

The biometric unit may be separate (logically and/or physically) from the communication unit. For example, the biometric unit and communication unit may be distinct components (such as separate IC chips) each embedded within the card.

Biometric communications are exchanged between the biometric unit and communication unit over the second physical interface 206 in accordance with a first communications protocol. Primary communications relating to the primary function of the card are exchanged between the contacts 201 and the communication unit 203. These primary communications are routed through the biometric unit 202 via the first physical interface 205 and the second physical interface 206 in accordance with a second communications protocol. Thus, the second physical interface 206 transports both primary communications and biometric communications between the biometric unit 202 and the communication unit 203. The first and second communications protocols may be the same. Alternatively, the first and second communications protocols may be different.

The card 200 is able to communicate with terminal 207 in a contact mode of operation. In the contact mode, the card 200 and terminal 207 are brought into physical contact, for example by inserting the card into a slot of the terminal. Contacts 201 of the card physically connect to contacts of the terminal. The first and second physical interfaces are conductive links. Thus, in the contact mode, the card is electrically connected to the terminal. Thus, the card draws power from the terminal through contacts 201. The biometric unit and communication unit are thereby powered by the terminal in the contact mode. In the contact mode, the communication unit 203 may communicate with the terminal 207 according to the ISO 7816 standard. In other words, in this implementation, the second communications protocol is ISO 7816. The biometric unit 202 may also communicate with the communication unit 203 according to the ISO 7816 standard. In this case, the first communications protocol is also ISO 7816.

Card 200 may additionally be capable of contactless communications. In this case, card 200 comprises an antenna 208. The antenna may comprise one or more coils of conductive material. A third physical interface 209 connects the antenna 208 to the communication unit 203. A fourth physical interface 210 connects the antenna 208 to the biometric unit 202. In the contactless mode of operation, the communication unit 203 communicates with the terminal 207 via a third communications protocol which is a wireless communications protocol. The antenna 208 receives wireless signals from the terminal, such as RF signals. These wireless signals contain data in accordance with the third communications protocol. The signals are routed to the communication unit 203 on the third physical interface. The communication unit 203 sends signals back to the terminal via the antenna 208. The biometric unit 202 is also connected to the antenna via the fourth physical interface 210. The card harvests power from the RF field at the antenna 208 whilst the antenna 208 receives communications from the terminal. The biometric unit and communication unit are thereby powered by the terminal in the contactless mode. In the contactless mode, the communication unit 203 may communicate with the terminal 207 according to the ISO 14443 standard. In other words, in this implementation, the third communications protocol is ISO 14443.

If card 200 is capable of contact and contactless communication with terminal 207, then it is a dual-interface card, since it has a physical communication interface and a contactless communication interface.

Figure 3A:
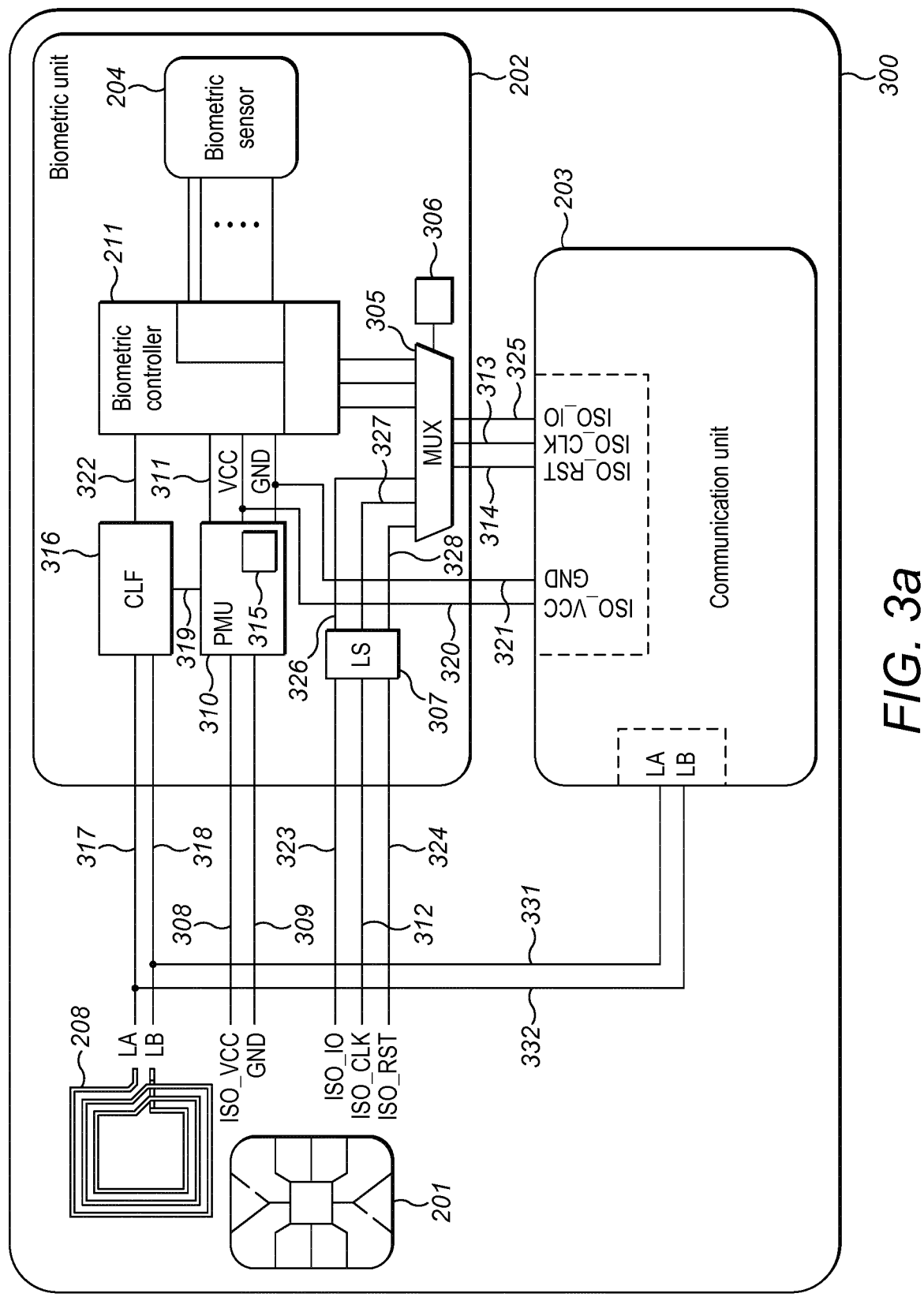
FIGS. 3a and 3b illustrate exemplary structures of the biometric unit and interfaces of the smart card of FIG. 2.

FIG. 3a illustrates an implementation of the general card architecture shown in FIG. 2. The biometric unit 202 comprises a multiplexer (MUX) 305 which receives: signal inputs according to the first communications protocol from the biometric controller 211; and signal inputs according to the second communications protocol from the contacts 201. The MUX multiplexes these received inputs onto the second physical interface for reception by the communication unit 203. The MUX also receives inputs from the communication unit 203 which it directs to the contacts 201 or biometric controller 211 as appropriate.

The MUX operates under the control of multiplexer controller 306, which in turn operates under the control of biometric controller 211. The biometric controller 211 may detect that the card is operating in a contact mode of operation. The biometric controller 211 may detect this by detecting power on the first physical interface, in other words detecting that the rail voltage is greater than zero (i.e. VCC>0). The biometric controller 211 thus controls the MUX controller 306 to control the MUX 305 to operate in a dynamic mode in which it multiplexes communications between the contacts 201 and the communication unit 203 and communications between the biometric unit 202 and the communication unit 203. The biometric controller 211 may determine that the card is operating in a contactless mode of operation. The biometric controller 211 may determine this if it does not detect power on the first physical interface, in other words the rail voltage is zero (i.e. VCC=0). The biometric controller 211 thus controls the MUX controller 306 to control the MUX 305 to operate in a static mode in which it directs all communications from the communication unit 203 to the biometric controller 211 and vice versa.

When the MUX 305 is operating in a dynamic mode, the biometric controller 211 controls when the MUX 305 routes communications from the communication unit via the second physical interface to the contacts 201 and when it routes them to the biometric unit. Similarly, the biometric controller 211 controls when the MUX 305 routes communications from the controls 201 to the communication unit via the second physical interface and when it routes communications from the biometric unit to the communication unit via the second physical interface. The biometric controller may implement this by monitoring the traffic between the contacts 201 and the communication unit 203. Specifically, the biometric controller may monitor for a flag/marker in the primary communications sent between the terminal and the communication unit. Suitably, that flag/marker indicates that no further primary communications are to take place between the terminal and the communication unit either for a predetermined period of time, or until communications are initiated again by either the terminal or the communication unit. Prior to detecting the marker, the biometric controller controls the MUX 305 to route primary communications between the contacts 201 and the communication unit 203 on the second physical interface. In response to detecting the marker, the biometric controller controls the MUX 305 to switch to routing biometric communications between the biometric controller and the communication unit 203 on the second physical interface. Once the biometric communications have completed, the biometric controller controls the MUX to switch to routing communications between the contacts 201 and the communication unit 203 on the second physical interface again. If the biometric controller detects that the terminal is attempting to initiate primary communications with the communication unit whilst biometric communications are taking place, the biometric controller may halt biometric communications and control the MUX to switch to routing primary communications on the second physical interface. The marker may be a contact mode Waiting Time Extension command from the communication unit to the terminal.

The communication unit or biometric unit may initiate the biometric verification process without involvement of the terminal. The biometric controller may start up the biometric sensor 204. In response, the biometric sensor senses biometric data of the user. For example, if the biometric sensor is a fingerprint sensor it may capture a fingerprint image, such as a grey level fingerprint image. The biometric controller then extracts the fingerprint features. These fingerprint features are the biometric data. The biometric data is compared to stored biometric validation data. If they match, for example if sufficient fingerprint features match the stored fingerprint features, then the user is validated. Otherwise, the user is not validated.

The matching step may occur at the biometric controller or the communication unit. If the matching step occurs at the biometric controller, then the biometric controller sends the result of the matching step to the communication unit over the second physical interface. If the matching step occurs at the communication unit, then the biometric controller sends the biometric data to the communication unit over the second physical interface.

The communication unit may send the result of the biometric validation process to the primary application on the communication unit. The primary application may take an action dependent on the outcome of the biometric validation. For example, if the primary application is a payment application, the primary application may respond to a successful biometric validation by sending a communication to the terminal. The terminal routes the communication to a back-end banking system which may approve a financial transaction on the basis that the biometric validation is successful. Suitably, no further user verification is required. If the biometric validation fails, the primary application may trigger further user verification. The further user verification may be, for example, the user entering a pin code into a card reader/payment terminal. Further user verification may be required for other reasons, for example if the maximum amount which can be authorised by a biometric validation is exceeded.

Figure 3B:
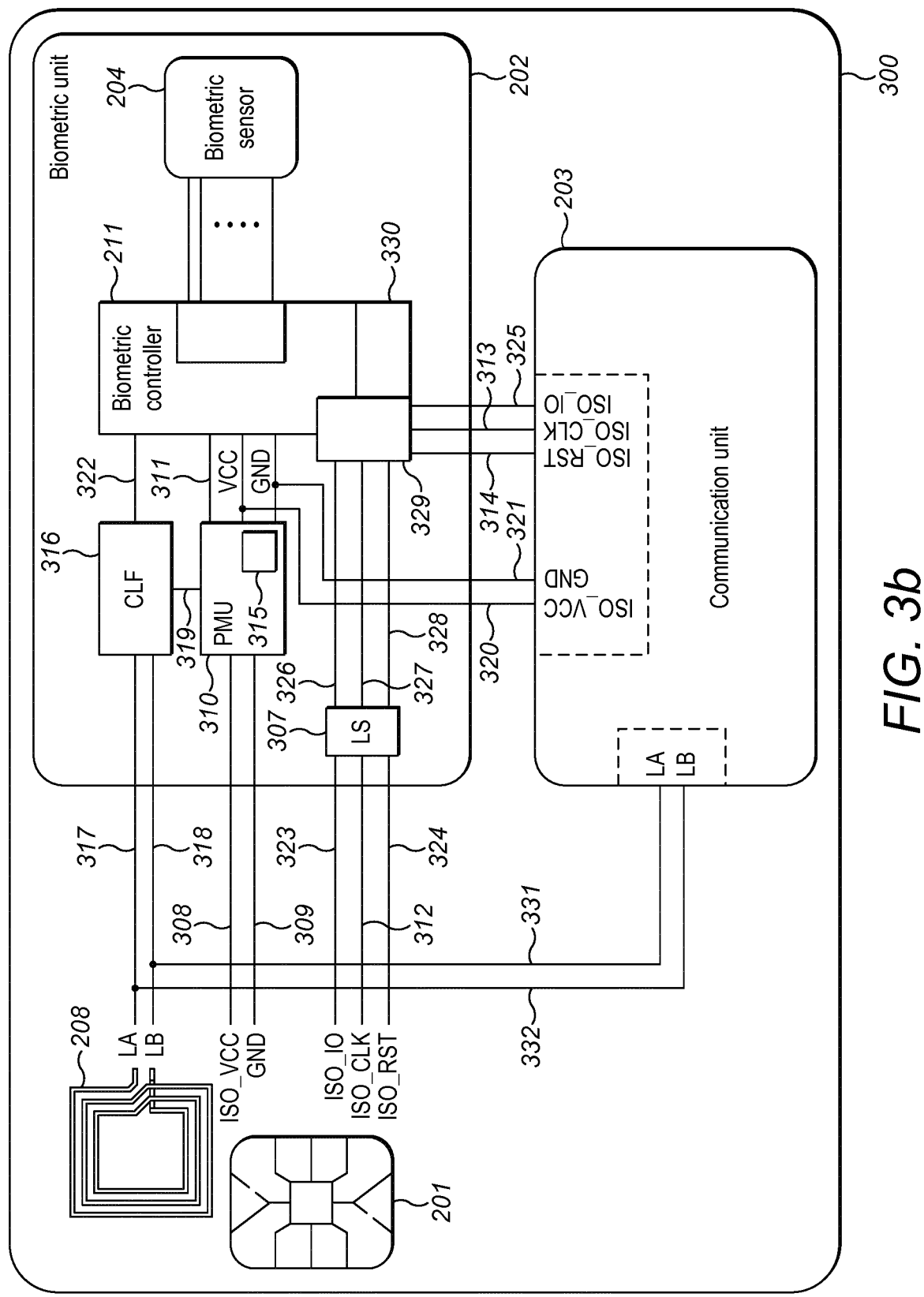

FIG. 3b illustrates a further implementation of the general card architecture shown in FIG. 2. The difference between FIGS. 3a and 3b is that the multiplexing function in FIG. 3b is incorporated within the biometric controller 211. The multiplexer in FIG. 3a operates at an electrical level. The multiplexing function in FIG. 3b operates at a higher level. For example, it may be implemented in software and operate on larger items of data, such as bytes of data. Thus, the biometric controller is connected to the contacts 201 via the first physical interface. Primary communications between the terminal and the communication unit are routed through the multiplexer in the biometric controller. Thus, the biometric controller acts as a bridge between the contacts and the communication unit.

As described above, the biometric controller 211 may determine whether the card is communicating with the terminal in a contact or contactless mode of operation by assessing whether there is power on the first physical interface. Referring to FIGS. 3a and 3b, the power lines of the first physical interface are the high rail 308 at VCC and the ground rail 309. These power lines connect contacts 201 to the power management unit PMU 310 of the biometric unit 202. A sense line 311 connects the PMU to the biometric controller 211. If the sense line indicates that VCC>0, then the biometric controller determines that the card is operating in a contact mode of operation. If the sense line indicates that VCC=0, then the biometric controller determines that the card is operating in a contactless mode of operation. The biometric controller 211 may determine whether the card is communicating with the terminal in a contact or contactless mode of operation by assessing whether there is an active clock on the clock line 312 on the first physical interface. If the biometric controller detects the presence of a clock on the clock line 312, then it determines that the card is operating in a contact mode of operation. If the biometric controller detects that there is no clock on the clock line 312, then it determines that the card is operating in a contactless mode of operation.

The communication unit 203 can determine whether the card is communicating with the terminal in a contact or contactless mode of operation by determining the origin of the messages it receives on the second physical interface. If the messages originate from the terminal 207, then the communication unit 203 determines that it is operating in a contact mode of operation. If the messages originate from the biometric unit 202, then the communication unit determines that it is operating in a contactless mode of operation. In an alternative method, the communication unit 203 may listen for traffic on the third physical interface connected to the antenna 208. If the communication unit 203 detects traffic on the third physical interface via signal lines 331, 332, then it determines that it is operating in a contactless mode of operation. If the communication unit does not detect any traffic on the third physical interface, then it determines that it is operating in a contact mode of operation.

Optionally, the communication unit may be able to infer that it is operating in a contactless mode of operation by assessing the signals on the clock line 313 and optionally the reset line 314 on the second physical interface. If the sequencing of the clock and reset signals are according to the second communications protocol, then the communication unit may determine that the card is operating in a contact mode of operation. If the sequencing of the clock and reset signals are not according to the requirements of the second communications protocol, then the communication unit may infer that the second physical interface is being used to send biometric communications, and hence that the card is operating in a contactless mode of operation.

Whilst the card is operating in a contact mode of operation, the user may transition the card to a contactless mode. For example, the user may remove their card from the terminal and hold it within wireless reception range. Suitably, in this situation, the communication unit 203 resets the card.

Whilst the card is operating in a contactless mode of operation, the user may transition the card to a contact mode. For example, the user may insert their card into the terminal. The MUX controller 306 operating under the control of the biometric controller 211 may detect the presence of power on power lines 308, 309. The MUX controller may respond to this detection by controlling the MUX to change state from a static to a dynamic mode of operation. The terminal may perform a reset of the communication unit 203. Suitably, this is a warm reset which does not interrupt power to the communication unit.

In the examples of FIGS. 3*a* and 3*b*, power to both the biometric unit and the communication unit is drawn from the terminal. The power is provided to both the components of the biometric unit and the communication unit from the power management unit PMU 310 of the biometric unit in both contact and contactless modes of operation. In the contact mode of operation, the PMU 310 receives power from the contacts 201 on power lines 308, 309 of the first physical interface. The voltage on the power lines may be 5V±10% (class A), 3V±10% (class B), or 1.8V±10% (class C). Regulator 315 regulates the incoming voltage to the operating voltage of the biometric unit and communication unit. The operating voltage of the biometric unit and communication unit may be 2.5V. For class C operation, the operating voltage of the biometric unit and communication unit may be 1.8V. In the contactless mode of operation, the contactless front end CLF 316 of the biometric unit harvests power from the RF field at the antenna whilst the antenna receives primary communications from the terminal. The CLF 316 directs the received power to the PMU on line 319. The PMU regulator 315 then regulates the incoming voltage to the operating voltage of the biometric unit and communication unit. In both the contact and contactless modes of operation, the PMU 310 outputs: (i) a high voltage rail VCC 320 to both the biometric controller 211 and the communication unit 203, and (ii) a ground rail GND to both the biometric controller 211 and the communication unit 203. These rails are both in accordance with the second communications protocol.

The biometric controller 211 may determine whether the card is operating in a contact or contactless mode of operation by assessing whether there is power on the fourth physical interface. A sense line 322 from the CLF 316 to the biometric controller 211 indicates whether there is a power on the fourth physical interface. If the sense line indicates that the voltage from the antenna is greater than 0, then the biometric controller determines that the card is operating in a contactless mode of operation. If the sense line indicates that the voltage from the antenna is 0, then the biometric controller determines that the card is operating in a contact mode of operation.

The input/output signal I/O 323, clock signal CLK 312, and reset signal RST 324 incoming from the terminal on the first physical interface may be at a higher voltage than the operating voltage of the biometric unit and communication unit. Biometric unit 202 comprises a level shifter in the first physical interface. Level shifter (LS) 307 converts the voltage of signals received from the contacts 201 down to the operating voltage of the communication unit and outputs these to the MUX. Level shifter (LS) 307 also converts the voltage of signals received from the communication unit 203 via the MUX 305 up to the voltage of the terminal.

Figure 4A:
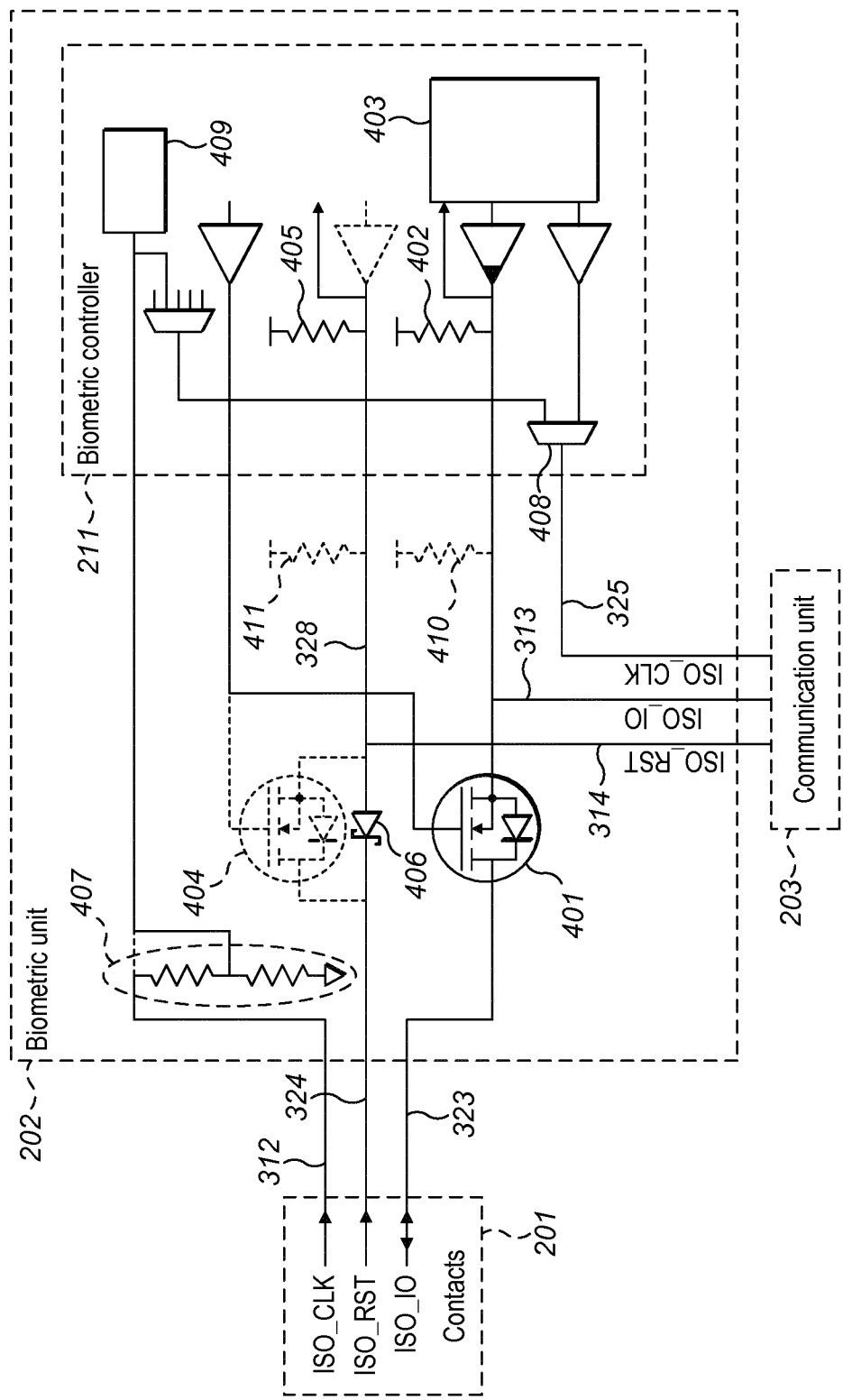
Figure 4B:
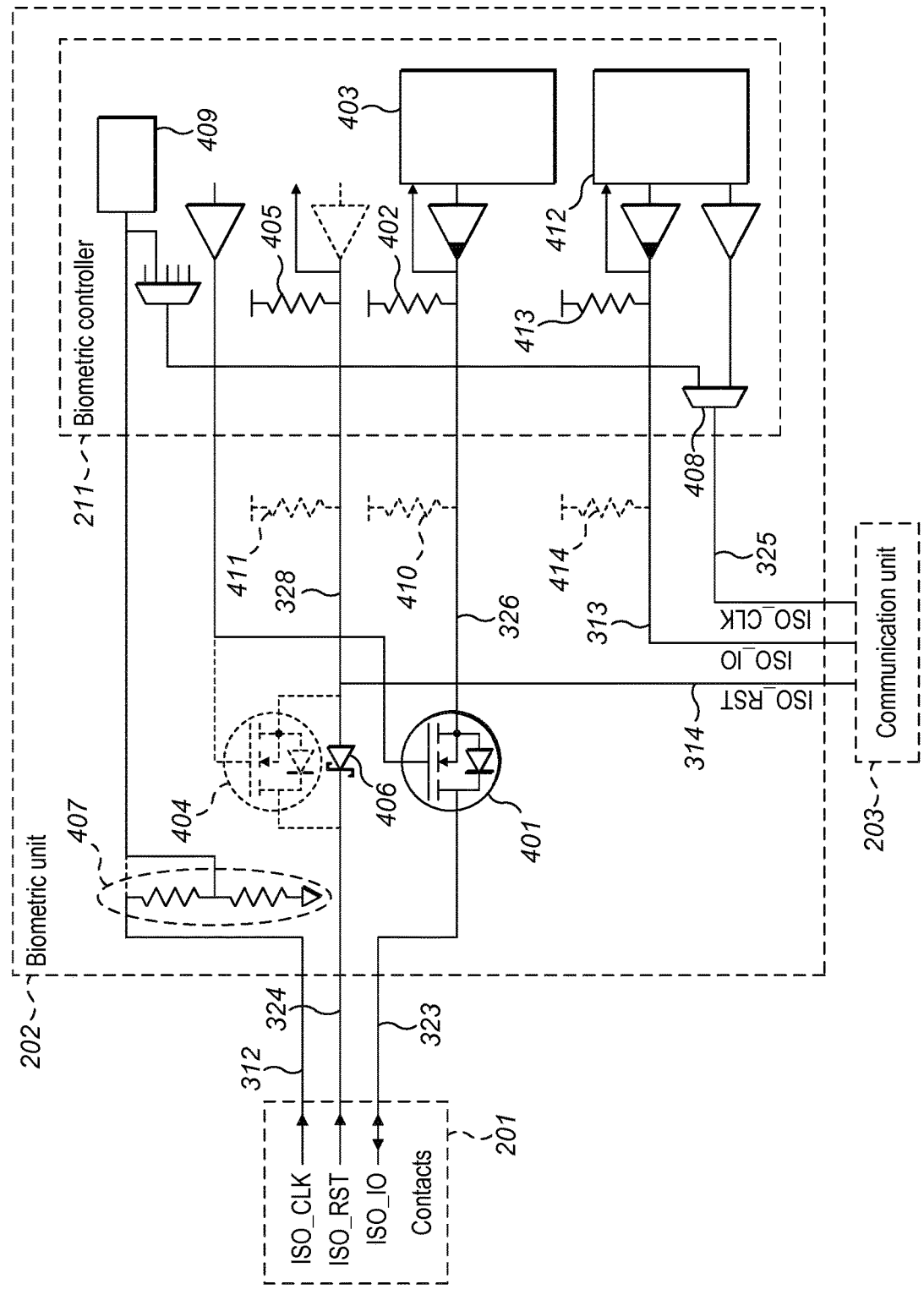
FIG. 4b illustrates exemplary structure of the level shifter and multiplexer of FIG. 3b.

In a preferred implementation of the card of FIGS. 3*a* and 3*b*, the level shifter LS 307 and MUX 305 are configured to electrically isolate the contacts 201 from biometric communications between the biometric unit 202 and the communication unit 203. FIG. 4*a* illustrates an exemplary structure of the LS 307 and MUX 305 of FIG. 3*a* which enables this electrical isolation. FIG. 4*b* illustrates an exemplary structure of the LS 307 and multiplexing function of FIG. 3*b* which enables this electrical isolation. The second communications protocol defines an input output signal I/O, a clock signal CLK, and a reset signal RST. The first and second physical interfaces each comprise signal lines for each of these signals. A signal is sent when the signal line is driven low. The following discusses example implementations of each of these signal lines on the first and second physical interfaces as shown in FIGS. 4*a* and 4*b*.

The I/O signal line on the first physical interface is provided with an isolator for isolating the contacts 201 from the biometric communications on the second physical interface. The isolator is directly connected to the I/O contact 201 on one side. In FIG. 4*a*, the isolator is directly connected to the communication unit and biometric controller on the other side. In FIG. 4*b*, the isolator is directly connected to the biometric controller on the other side. It is not directly connected to the communication unit. The isolator may be a one-way isolator. The isolator may be a pass transistor 401. For example, the pass transistor may be a FET. The gate of the pass transistor is connected to the biometric controller's supply voltage when the contacts are not isolated from communications on the second physical interface. The voltage on the biometric unit/communication unit side of the transistor is limited to the supply voltage of the biometric unit (e.g. 2.5V) minus the threshold voltage of the transistor, thus the isolation transistor also provides the level shifting function (307 in FIGS. 3*a* and 3*b*).

The I/O signal line is also provided with a resistive pull-up on the biometric controller/communication unit side of the transistor. The resistive pull-up pulls the signal on the biometric unit/communication unit side of the transistor to the supply voltage of the biometric unit 202 (e.g. 2.5V). In FIG. 4*a* the resistive pull-up for the biometric controller/communication unit side of the transistor may be provided by the integrated pull-up, 402, in the GPIO structure of the biometric controller. Alternatively, the resistive pull-up may be provided by a discrete resistor 410. In FIG. 4*b*, the resistive pull-up between the transistor and the biometric controller may be provided by the integrated pull-up 402 in the GPIO structure of the biometric controller. Alternatively, the resistive pull-up between the transistor and the biometric controller may be provided by a discrete resistor 410. There is also a resistive pull-up between the communication unit and the biometric controller. This may be provided by the integrated pull-up 413 in the GPIO structure of the biometric controller. Alternatively, the resistive pull-up between the communication unit and the biometric controller may be provided by a discrete resistor 414. The terminal also provides a resistive pull-up on the terminal side of the transistor (signal 323). The resistive pull-up pulls up the signal on the terminal side of the transistor to the supply voltage of the terminal (e.g. 5V).

The I/O signal is thus an open-collector (drain) signal with resistive pull-up. In FIG. 4*a*, a UART or USART module 403 in the biometric controller can manage the asynchronous serial transmission on the I/O signal line. In FIG. 4*b*, two UART/USART modules 403 and 412 in the biometric controller manage the asynchronous serial transmission on the I/O signal line. UART/USART module 403 is connected to the I/O line 323 of the contacts via the transistor 401. UART/USART module 412 is connected to the I/O line 313 of the communication unit. The signal to the gate of the transistor can be used to isolate the contacts 201 from communications on the second physical interface. The gate of the transistor is driven low by the biometric controller. This prevents the contact side 323 of the transistor being driven low when the I/O line 313 on the second physical interface is driven low by either the biometric controller or the communication unit. Thus, a terminal connected to the I/O contact will not see communications between the biometric unit and the communication unit on the I/O line. The isolation may be one-way. In other words, if the terminal drives the I/O signal line low at the contact 201 side of the transistor, the I/O signal lines 326, 313 on the biometric unit/communication unit side of the transistor will also be driven low. Thus, this architecture enables isolation of the terminal from traffic on the I/O signal line between the communication unit and the biometric unit, but does not isolate the biometric unit/communication unit from traffic on the I/O signal line of the contacts/terminal.

The RST signal line on the first physical interface may comprise the same componentry as the I/O signal line, i.e. an in-line isolator 404 and resistive pull-up (either internal to the biometric controller, 405, or a discrete resistor, 411). The implementation of the isolator and resistive pull-up may be as described with respect to the I/O signal line above. Alternatively, instead of a pass transistor, the isolator may be a diode on the RST line of the first physical interface. The diode is directly connected to the RST contact 324 on one side. On the other side, the diode is connected to both the RST lines of the communication unit 314 and the biometric unit 328. Suitably, the diode has a low forward voltage drop, in order to ensure, when signal 324 is pulled low by the terminal, that the voltage on the signal 328 (seen by the communication unit and the biometric controller) is seen as a logic low Whether the isolator is implemented by a diode, or a FET (noting the bulk diode between source and drain) then the terminal, when connected to the contacts, is able to drive the RST signal line, 328, low. In other words, the terminal is able to force the card to reset. This is the case even when the terminal is isolated from the data traffic between the biometric unit and communication unit on the I/O line of the second physical interface. If the isolator is implemented by a diode, neither the biometric unit nor the communication unit are able to drive the RST signal line, 324, on the contact side of the diode low. Thus, neither the biometric controller nor the communication unit are able to force the terminal to reset. As with the I/O signal line, the resistive pull-up pulls the signal on the biometric controller/communication unit side of the isolator to the supply voltage of the biometric controller 202.

The terminal provides a CLK signal on the CLK signal line 312 of the first physical interface. This is input to the biometric unit. The biometric unit converts the voltage of the CLK signal from the terminal to the operating voltage of the biometric unit (for example from 5V to 2.5V). Suitably, the CLK input signal to the biometric unit on the first physical interface is a 5V tolerant input. The first physical interface may include voltage limiting circuitry to reduce the voltage of the CLK signal from the terminal. The voltage limiting circuitry may be, for example, a potential divider 407 or other clamping device. The first physical interface includes such circuitry if the maximum voltage excursion provided by the terminal exceeds the operational limits of the biometric controller.

The biometric unit outputs a clock signal onto the CLK signal line of the second physical interface, which the communication unit receives. Multiplexing circuitry 408 in the biometric controller outputs a clock signal onto the second physical interface selected from: (i) the (voltage limited) terminal clock signal, and (ii) a clock signal generated internally at the biometric controller. Suitably, UART/USART 403 in FIG. 4*a* (UART/USART 412 in FIG. 4*b*) provides the internally generated clock signal. The biometric controller controls the multiplexing circuitry to output:

(i) the voltage limited terminal clock signal if the card is operating in contact mode, and the terminal is not to be isolated from the biometric unit/communication unit. For example, in the case that primary communications are being exchanged between the terminal and the communication unit through the contacts 201.

(ii) the internally generated clock signal if the card is operating in a contactless mode. In this case no clock signal is being received from the terminal since the terminal is not electrically connected to the card at the contacts 201.

(iii) the internally generated clock signal if the card is operating in contact mode, and the terminal is to be isolated from the biometric unit/communication unit. For example, in the case that biometric communications are being exchanged between the biometric unit and the communication unit at a data rate unconnected with the data rate of the terminal.

On establishment of primary communications between the terminal and the communication unit, the biometric controller selects the baud rate of the UART/USART 403 in FIG. 4*a* (UART/USART 412 in FIG. 4*b*) to be proportional to the terminal clock frequency on the clock signal line of the first physical interface. This enables the biometric controller to be synchronised with the primary communications between the terminal and the communication unit, and hence enables the biometric controller to listen to these communications. In the case that the first communications protocol is ISO 7816-3, the relationship between the baud rate and the terminal clock frequency is defined by the protocol. This relationship is set according to the F and D communication parameters established during the Answer to Reset (ATR) and Protocol and Parameter Selection (PPS) exchanges when the card is inserted into the terminal. The biometric controller may control the baud rate of the UART/USART to track changes in the terminal clock frequency in real time. Alternatively, the terminal clock signal on the first physical interface may be input to a timer module 409 in the biometric controller. The timer module 409 determines the frequency ratio between the terminal clock signal and the internal system clock of the biometric controller. The controller sets the baud rate of the UART/USART in response to this frequency ratio. This baud rate is that used for the primary communications between the terminal (card-reader) and the communication unit.

When the terminal is isolated from the biometric communications between the biometric unit and the communication unit, the biometric controller and the communication unit may set at least one communication parameter of the biometric communications to be different to the communication parameters of the primary communications. For example, they may use a higher baud rate for the biometric communications than for the primary communications.

Initially, when the card is powered up, the biometric controller drives the gate of the transistor 401 high. The passive pull-ups on both the I/O signal line and the RST signal line are activated. The clock signal from the terminal is routed via the biometric controller to the communication unit. The communication unit and terminal are thereby able to exchange primary communications via the biometric controller.

Whilst the communication unit is performing contactless communications with the terminal via the antenna and third physical interface according to the third communications protocol, the biometric controller may perform biometric communications with the communication unit over the second physical interface according to the second communications protocol.

Figure 5:
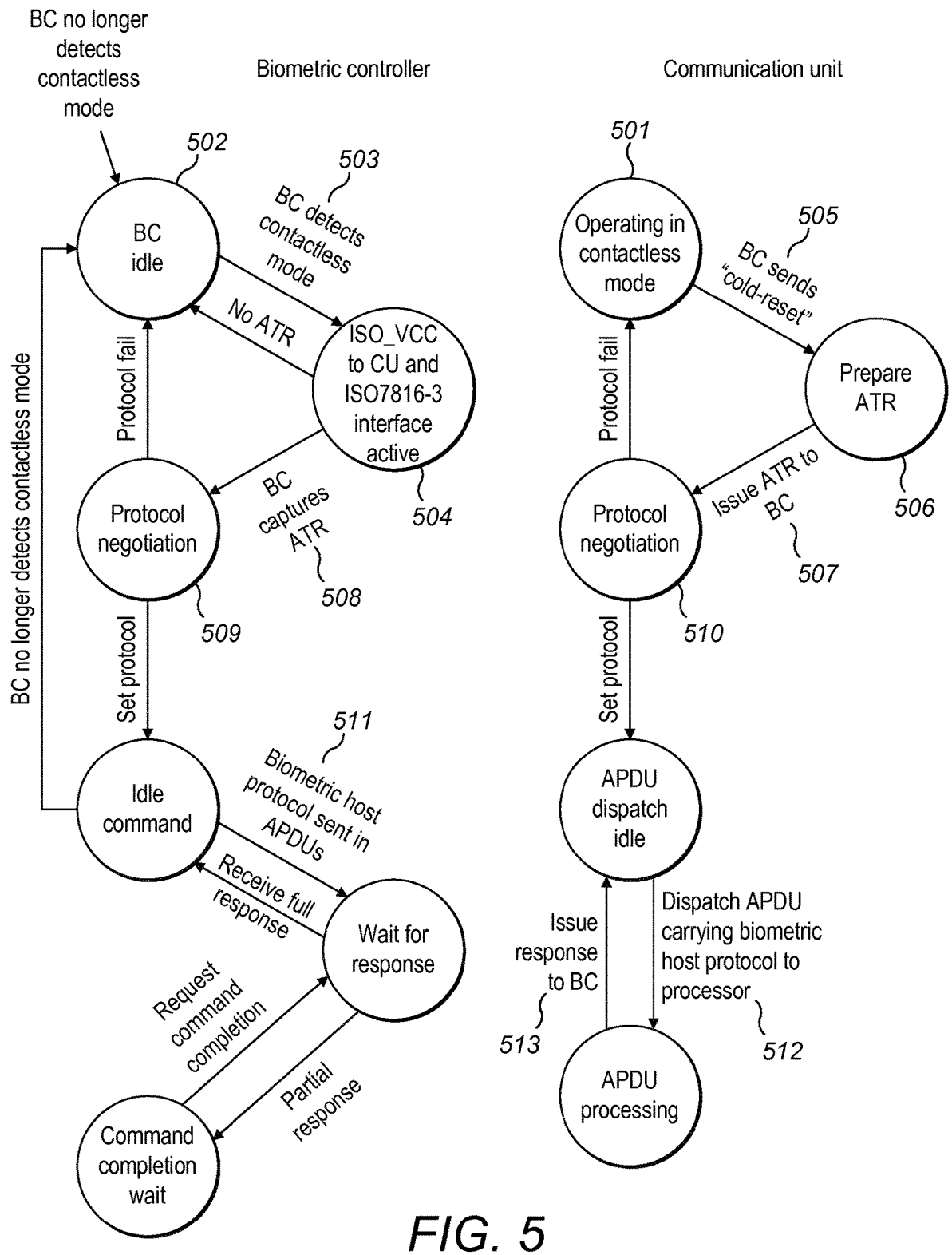
FIG. 5 illustrates state diagrams for the biometric controller and communication unit.

FIG. 5 illustrates state diagrams for both the biometric controller and the communication unit whilst establishing and carrying out the biometric communications for the example in which the first and second communications protocols are ISO 7816.

Initially, the card is in a contactless mode 501 and the biometric controller is idle 502. The Biometric controller powers up and detects that the card is in a contactless mode 503. The biometric controller responds by initiating a start-up sequence. In that start-up sequence, the power management unit 310 directs power from the contactless front end 316 to the communication unit 203. In other words, ISO_VCC is applied to the communication unit 504. The biometric controller activates the second physical interface, i.e. the ISO 7816 interface, between the biometric controller and the communication unit. This puts the communication unit in a pseudo contact mode, in which it is using the ISO 7816 interface to communicate with the biometric controller rather than a terminal. The biometric controller activates the ISO 7816 interface by sending a cold-reset 505 to the communication unit over the ISO 7816 interface in accordance with the ISO 7816-3 standard. The communication unit responds to the cold reset by generating 506 and sending 507 an Answer to Reset ATR message. The biometric controller captures the ATR message 508, from which it determines that the ISO 7816 link with the communication unit has been established. The biometric controller and communication unit may establish communication parameters for the biometric data exchange by one of:

(i) carrying out a protocol negotiation 509, 510 once the ISO 7816 interface has been activated. This may be done using a Protocol and Parameter Selection (PPS) exchange;

(ii) the ATR message 507 sent by the communication unit identifying a specific protocol and/or set of parameters to use; and (iii) the communication parameters for the biometric exchange being predetermined, and hence compiled in code stored in memory and executed by processors of both the biometric controller and communication unit.

Once the ISO 7816-3 communication link has been established, the biometric controller and communication unit carry out the biometric exchange by embedding biometric communications within ISO 7816-3 messages.

Figure 6:
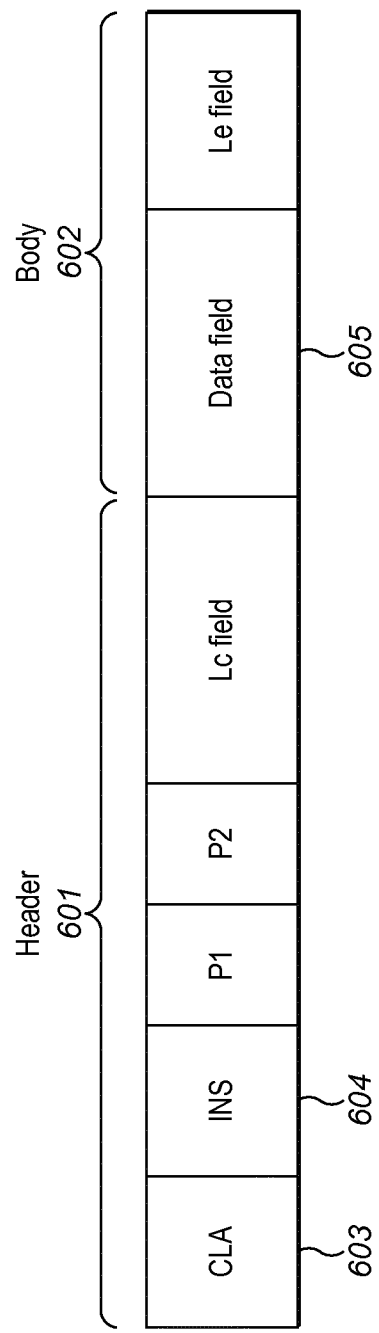
FIG. 6 illustrates the format of an ISO 7816 APDU.

The ISO 7816 protocol requires data to be carried in Application Protocol Data Units (APDU). Thus, the biometric controller and communication unit each embed biometric communications within APDUs and send the APDUs on the ISO 7816 interface to each other 511, 512, 513. FIG. 6 illustrates the format of an ISO 7816 APDU. The header 601 comprises a class CLA field 603. This is the most significant byte of the header. In an exemplary implementation, the biometric controller and communication unit each set the most significant nibble of the CLA field to a predetermined value. The biometric controller and communication unit are configured to interpret the predetermined value as indicating that the APDU comprises an embedded biometric communication. The most significant nibble is typically set to 0 for non-banking (inter-industry) applications. The most significant nibble is typically set to 8 for banking cards. Suitably, the predetermined value for the most significant nibble is a value different from 0 and 8. For example, the predetermined value for the most significant nibble may be C.

The header 601 of the APDU also comprises an instruction INS field 604. The INS field is one byte long. The contents of the INS field are not defined by the ISO 7816 protocol. Thus, predetermined values of the INS field are used by the biometric controller and communication unit to denote specific instructions to each other as follows. There is a predetermined value of the INS field in APDUs sent from the biometric controller to the communication unit to communicate each of the following:

(i) Polling the communication unit for a biometric command request;

(ii) Sending a Waiting Time Extension WTX event notification to the communication unit;

(iii) Requesting a biometric command from the communication unit; and (*iv*) Sending a response from the biometric controller to the communication unit.

There is a predetermined value of the INS field in APDUs sent from the communication unit to the biometric controller to communicate each of the following:
(i) A response to the biometric command request poll;
(ii) A WTX event has been completed; and (iii) A biometric command is to be processed by the biometric controller.

The biometric data is included in the payload/data field 605 of the body of the APDUs.

In the contact mode of operation, the terminal may be the master of the ISO 7816 interface protocol with the communication unit, and the communication unit the slave. If the primary communications are routed through the biometric controller as shown in FIG. 3b, then the biometric controller is the slave 329 of the ISO 7816 interface protocol with the terminal, and the master 330 of the ISO 7816 interface protocol with the communication unit.

The communication unit may be the master of the ISO 7816 interface protocol with the biometric controller, and the biometric controller the slave. Alternatively, the biometric controller may be the master of the ISO 7816 interface protocol with the communication unit, and the communication unit the slave.

In the described architecture, the need for a dedicated physical interface between the communication unit and the biometric unit, such as an SPI or I2C interface, is removed. The communication unit need only support a typical contact (e.g. ISO 7816) interface in order to enable biometric functionality on the card. The communication unit supports this interface for contact communications with the terminal anyway. It is therefore convenient to utilise the same interface for biometric communications with the biometric unit. No additional interfaces are required of the communication unit in order to carry out the biometric functionality described herein. If the card additionally has a typical contactless (e.g. ISO 14443) interface, the communication unit can communicate wirelessly with the terminal via the antenna whilst also processing biometric APDUs received on the contact interface from the biometric unit.

In the described architecture, the protocol stacks of the communication unit already implemented for ISO 7816 contact communications with the terminal are re-purposed for ISO 7816 biometric communications with the biometric controller, enabling a straightforward, fast implementation. Additionally, the card operating system can already extract APDUs from the ISO 7816 physical layer. By minimising the changes required to the operating system and the software running on the communication unit (by re-purposing the ISO 7816 interface for biometric communications), security certification for a card incorporating biometric functionality is likely to be more easily achieved. Also, using the APDU structure of the ISO 7816 protocol enables the use of well-established encryption protocols to ensure a secure channel between the biometric controller and the communication unit.

By electrically isolating the contacts 201, and hence a connected terminal 207, from data traffic on the second physical interface, the biometric communications between the biometric unit and the communication unit are "private". Since the terminal is isolated from the biometric communications, no modifications of the terminal are required to tolerate the biometric communications. Thus, the terminal cannot act erroneously as a result of the biometric functionality of the card.

Since the biometric communications are private between the biometric unit and the communication unit, they need not use the same communication protocol or parameters as agreed between the communication unit and terminal for the primary communications. Although ISO 7816-3 is used for the primary communications, the biometric communications need not adhere to the ISO 7816-3 protocol either in the establishment and negotiation of the biometric protocol or in the ongoing communication. If the ISO 7816-3 protocol is used, the clock frequency on the second physical interface, and the ratio between this clock frequency and the baud-rate of the biometric data are freely selectable by the biometric controller and/or communication unit. Since the physically small I/O signal line between the biometric unit and the communication unit is decoupled from the larger I/O signal line to the terminal, the biometric communications may be implemented with a higher data rate than expected by the ISO 7816-3 standard.

Although the card described herein incorporates biometric functionality, the card is operable in both a contact and contactless mode without the biometric functionality being active. The biometric controller will control the PMU 310 to route power to the communication unit if the biometric functionality is not active. The biometric controller will control the MUX 305 to route primary communications from the contacts 201 to the communication unit if the biometric functionality is not active.

The card architectures described herein enable compliance with industry standards governing contactless communications between a smart card and a terminal. Compliance with these industry standards, amongst other benefits, allows biometric-enabled smart cards to be operated with terminals without modification of those terminals. Taking the example of payment cards, this enables the biometric smart cards to be used with existing terminals such as point of sale terminals and ATMs. The architectures described herein support power control and scheduling mechanisms which ensure that the primary communications between the communication unit and the terminal are not disrupted by the addition of the biometric functionality to the card, even though the biometric unit also draws power from the terminal and communicates with the communication unit.

The power control mechanisms supported by the architectures described herein are as described in the applicant's co-pending application GB 1803938.8, which is hereby incorporated by reference. Those power control mechanisms ensure that sufficient power is available for both the primary function of the communication unit and the biometric function of the card to complete. The communication unit complies with power management constraints by entering a low power state (e.g. drawing <1.5 mA) when the biometric system is active. Similarly, whilst the communication unit exchanges primary communications with the terminal, the biometric system is in a low power (e.g. drawing <3 mA) and low noise state.

The scheduling mechanisms supported by the architectures described herein are as described in the applicant's co-pending application GB 1803935.4, which is hereby incorporated by reference. Those signalling mechanisms between the biometric unit and the communication unit ensure that the timing of operations by the biometric function do not interfere with the timing of operations by the primary function of the communication unit with the terminal. In the case that the biometric communications are transported over an ISO 7816 interface, WTX timing events are communicated between the communication unit and biometric controller. Either the communication unit or the biometric controller is the WTX timing master. The WTX timing on the biometric controller is configurable (e.g. between 20 and 4000 ms). As described above, all biometric communications may be embedded in ISO 7816 APDUs. For example, software based handshaking and signalling may be mapped into the INS field of the APDU shown in FIG. 6. Similarly, all biometric communications relating to power management are embedded in APDUs.

In the examples given above, the term power is understood to refer to any relevant feature of energy availability. Examples include available energy, voltage, current and power or any combination thereof.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A device configured to communicate with a terminal, the device comprising:
   a communication unit configured to communicate with the terminal;
   a biometric unit comprising a biometric sensor configured to sense biometric data;
   contacts configured to connect the device to the terminal;
   an antenna;
   a first non-router physical interface between the biometric unit and the contacts, wherein the first non-router physical interface is at least one continuous signal line having two ends, wherein a first end of the two ends is connected directly to the contacts and wherein a second end of the two ends is connected directly to the biometric unit, and wherein the first non-router physical interface enables contact communication between the biometric unit and the terminal;
   a second non-router physical interface between the communication unit and the biometric unit, wherein the second non-router physical interface is at least one continuous signal line having two ends, wherein a first end of the two ends is connected directly to the biometric unit and wherein a second end of the two ends is connected directly to the communication unit, and wherein the second non-router physical interface enables contact communication between the communication unit and the biometric unit;
   a third non-router physical interface between the antenna and the communication unit, wherein the third non-router physical interface is at least one continuous signal line having two ends, wherein a first end of the two ends is connected directly to the antenna and wherein a second end of the two ends is connected directly to the communication unit, and wherein the third non-router physical interface enables contactless communication between the terminal and the communication unit; and
   a fourth non-router physical interface between the antenna and the biometric unit, wherein the fourth non-router physical interface is at least one continuous signal line having two ends, wherein a first end of the two ends is connected directly to the antenna and wherein a second end of the two ends is connected directly to the biometric unit, and wherein the fourth non-router physical interface enables contactless communication between the terminal and the biometric unit,
   the device being configured to harvest power from a radio frequency field received at the antenna when the antenna is receiving communications from the terminal, and route power from the antenna to the communication unit through the biometric unit via the fourth and second non-router physical interfaces, the device being further configured such that all contact communications between the terminal and the communication unit are routed through the biometric unit via the first and second non-router physical interfaces, and
   the device being configured such that the second non-router physical interface carries both biometric communications and primary communications, the biometric communications originating from the biometric unit or communication unit and being destined for the communication unit or biometric unit, the primary communications originating from the terminal or communication unit and being destined for the communication unit or terminal.

2. A device as claimed in claim 1, the biometric unit comprising a biometric controller configured to control operation of the biometric unit, wherein the biometric unit comprises a multiplexer, the multiplexer configured to:
   receive inputs from the contacts and from the biometric controller, and multiplex those received inputs onto the second non-router physical interface; and
   receive inputs from the communication unit on the second non-router physical interface, and direct those received inputs to the contacts or biometric controller.

3. A device as claimed claim 1, configured to enable contact communication between the communication unit and biometric unit according to a first communications protocol, and contact communication between biometric unit and the terminal according to a second communications protocol.

4. A device as claimed in claim 3, wherein the first communications protocol is the same as the second communications protocol and wherein the biometric unit and communication unit are configured to embed biometric communications within messages of the first communications protocol.

5. A device as claimed in claim 4, wherein the biometric unit and communication unit are configured to utilize at least one different communication parameter for biometric communications and primary communications.

6. A device as claimed in claim 4, wherein the biometric unit and communication unit are configured to use a higher baud rate for biometric communications than primary communications.

7. A device as claimed in claim 1, wherein the first communications protocol is ISO 7816 and wherein the biometric unit and communication unit are configured to set the most significant nibble of the class CLA field of the header of each Application Protocol Data Unit (APDU) of ISO 7816 to a predetermined value to identify the APDU as carrying a biometric communication.

8. A device as claimed in claim 1, configured such that when the device is in contact with the terminal, power is received through the contacts and routed to the communication unit via the biometric unit.

9. A device as claimed in claim 1, wherein the communication unit is configured to detect: (i) that it is in a contact mode of operation if the communications on the second non-router physical interface it receives originate from the contacts, and (ii) that it is in a contactless mode of operation if the communications on the second non-router physical interface it receives originate from the biometric unit.

10. A device as claimed in claim 1, wherein the communication unit is configured to detect that it is in a contactless mode of operation if it senses either: (i) traffic on the third non-router physical interface, or (ii) power on the fourth non-router physical interface.

11. A device as claimed in claim 1, wherein the biometric unit is configured to detect that it is in a contact mode of operation if it senses either: (i) power on the first non-router physical interface, or (ii) a clock signal on the first non-router physical interface.

12. A device as claimed in claim 2, wherein the biometric controller is configured to:
monitor primary communications between the terminal and the communication unit for a marker; and
on identifying the marker, controlling the multiplexer to switch from routing primary communications between the contacts and the communication unit to routing biometric communications between the biometric controller and the communication unit.

13. A device as claimed in claim 2, the biometric controller being configured to output one of the following as a clock interface signal: (i) a voltage calibrated version of a terminal clock signal from the terminal; and (ii) an internally generated clock signal from the biometric controller.

14. A device as claimed in claim 2, wherein the biometric controller is configured to, whilst the communication unit is performing contactless communications with the terminal, control the communication unit to perform biometric communications with the biometric controller over the second non-router physical interface according to the second communications protocol.

15. A device as claimed in claim 2, wherein the device is configured to electrically isolate the contacts from biometric communications between the biometric unit and the communication unit.

16. A device as claimed in claim 15, wherein the first non-router physical interface comprises an I/O signal line comprising an isolator configured to isolate the contacts from the biometric communications on the second non-router physical interface, wherein the isolator is either (i) a pass transistor, the gate of the pass transistor being connected to the supply voltage of the biometric controller, or a one-way isolator, wherein the I/O signal line further comprises a resistive pull-up on the biometric controller side of the isolator.

17. A device as claimed in claim 15, wherein the first non-router physical interface comprises a reset signal line comprising a one-way isolator configured to isolate the contacts from the biometric communications on the second non-router physical interface, wherein the one-way isolator is either:
(i) a pass transistor, the gate of the pass transistor being connected to the supply voltage of the biometric controller, or
(ii) a diode, and
wherein the reset signal line further comprises a resistive pull-up on the biometric controller side of the one-way isolator.

18. A device as claimed in claim 15, configured to output a clock interface signal from the biometric controller onto a clock signal line on the second non-router physical interface to isolate the contacts from the biometric communications on the second non-router physical interface.

19. A device as claimed in claim 18, wherein the biometric controller is configured to select the baud rate of biometric communications with the communication unit to be proportional to the frequency of the clock interface signal.

* * * * *